United States Patent Office 3,272,601
Patented Sept. 13, 1966

3,272,601
PREPARATION OF BINARY COMPOUNDS OF URANIUM AND THORIUM
Wilford N. Hansen, Thousand Oaks, Calif., assignor, by mesne assignments, to the United States of America as represented by the United States Atomic Energy Commission
No Drawing. Filed Mar. 3, 1964, Ser. No. 349,173
9 Claims. (Cl. 23—349)

This invention is a continuation-in-part of my copending application S.N. 159,764, filed December 15, 1961, now U.S. Patent 3,125,497.

This invention relates to a process for the preparation of the binary compounds of a refractory metal and an electronegative element. More particularly, it relates to a process for preparing a binary compound of an actinide series metal and an electronegative element selected from the second period of the class consisting of carbon, nitrogen, and oxygen. Still more particularly, it relates to the preparation of uranium carbide.

Uranium carbide, particularly as stoichiometric uranium monocarbide (UC), is of interest and of increasing importance as a nuclear reactor fuel. It has excellent thermal and dimensional stability at high temperatures and neutron fluxes and is capable of extended burnup before reprocessing. Further, uranium carbide, unlike other ceramic nuclear fuels such as uranium oxide, has very good thermal conductivity, approaching that of the metallic fuel compositions. The development of a reprocessing cycle for uranium carbide which is economical and convenient and which achieves high decontamination from fission products is consequently of considerable importance. An important step in one such cycle is the conversion of uranium metal to uranium carbide.

It is a general object of this invention to provide a process for the preparation of binary inorganic compounds of refractory metals and electronegative elements.

It is another object to provide a process for the preparation of the carbides, nitrides, and oxides of the metals of the actinide series.

It is still another and more particular object to provide a method for the formation of uranium carbide from uranium metal.

In accordance with the broad aspects of the invention, a two-step process is used in which a refractory metal value, preferably in the form of the metal, or as its binary compound, is first reacted at elevated temperature with a group II-B metal (zinc, cadmium, or mercury) to form a nonstoichiometric reaction product of the refractory metal and the group II-B metal, containing the II-B metal in excess. The reaction product is then heated in an atmosphere of a gas providing the desired electronegative element so that the group II-B metal is displaced by the electronegative element of the gas to provide the desired binary compound of the refractory metal and the electronegative element.

In its more specific aspects the refractory metal is a member of the actinide series, particularly uranium or thorium, the group II-B metal is preferably mercury, because of its lower boiling point making for ease of subsequent purification, and the electronegative element is of the second period selected from the class consisting of carbon, nitrogen, and oxygen, yielding, respectively, the carbide, nitride, or oxide.

Uranium and thorium are preferred as the metals of the actinide series. In accordance with a specific and preferred embodiment of this invention, the preparation of uranium carbide, particularly uranium monocarbide, will be described. Other objects, advantages, and features of this invention will be readily apparent from the following description of this preferred embodiment of the invention.

The efficient utilization of uranium monocarbide as an atomic power reactor fuel requires that it be periodically reprocessed. Its over-all usefulness as a fuel depends, to a significant extent, upon how easily this reprocessing can be carried out. Therefore, while one may start with pure uranium metal and convert it to uranium carbide in accordance with the invention, this conversion will be principally described as part of a method for reprocessing uranium carbide wherein uranium metal is formed in situ.

This reprocessing method involves three steps:

(1) The uranium carbide requiring reprocessing is anodically dissolved in a fused mixture of halides as the electrolyte. Uranium metal forms at the cathode, as a dendritic mass, which occludes electrolyte salt.

(2) The cathode deposit, with its occluded salt, is immersed in hot mercury (near its boiling point). The finely divided uranium readily reacts with the mercury to form a fluid quasi-amalgam phase which separates from the salt and other impurities.

(3) The uranium-mercury quasi-amalgam is heated in an atmosphere of hydrocarbon gas, e.g., methane, propane.

The quasi-amalgam is heated in the hydrocarbon gaseous atmosphere to cause rapid formation of uranium carbide and to drive off the mercury (the final temperature being less than 600° C.). Uranium, which is present in the finely divided form, readily reacts with the hydrocarbon gas to form stoichiometric uranium monocarbide. Distillation of the mercury and formation of the carbide can be facilitated by passing the gas through the quasi-amalgam, but this is not essential.

The term "quasi-amalgam" is used to indicate that a single homogeneous phase, i.e., a true solution, of uranium and mercury is not formed. Rather the reaction product is similar to an amalgam, but contains a larger quantity of uranium in the mercury than could be dissolved to form a true solution. Also, some of the uranium in solution or suspension in the mercury is in the form of uranium mercuride.

The uranium may also be electrolyzed directly into a mercury cathode. The formation of the nonstoichiometric quasi-amalgam phase, i.e., a phase consisting of mercury with uranium mercuride dispersed therethrough, has the important advantage that the uranium forms a fluid metal phase which separates from the salt and other phases not soluble in mercury. Uranium values are recoverable from the quasi-amalgam either as the metal or as mercury-free uranium carbide, the latter being formed by heating the quasi-amalgam directly in an atmosphere of hydrocarbon gas.

In processing uranium carbide, it is readily anodically dissolved in a molten fused salt bath, and the uranium is deposited on a metal cathode. The fused uranium carbide retains its form and dissolves in the manner of a metal, the uranium going into solution and the carbon dispersing in the bath. The electrolyte comprises at least one alkali metal halide or alkaline earth metal halide, and is chosen because of its stability. The salt must be stable to oxidation, or it will be decomposed at the anode when reasonable current densities are applied, making subsequent dissolution of uranium carbide difficult. Further, it would be impossible to deposit pure uranium metal from the bath. Also, liberation of halogen during salt decomposition may contaminate the cathode deposit.

Of the various halides which may be used satisfactorily, the chlorides are especially suitable because of their relatively low cost, availability, and stability. The bromides have lower melting points, and the use of such salts may be advantageous when employing a liquid mercury cathode. Mixtures of the halide salts are relatively lower melting and are therefore preferred. The KCl–LiCl eutectic is especially useful because of its stability and melting point of 352° C., which is below the boiling point of mercury. A uranium halide, such as $UF_4, UBr_4$, or $UCl_3$, is added to the electrolyte to prevent deposition of alkali metal or of alkaline earth metal. The melting point of the resulting composition remains below the boiling point of mercury.

The low melting feature of the electrolyte is significant in the later mercury separation step. Thus, the salt that is occluded in the uranium cathode deposit will readily melt to expose the dendritic uranium in the near-boiling mercury. Where a higher melting halide salt composition is used, a molten halide salt may be provided as a cover over the hot mercury, and this molten salt would then dissolve the occluded salt.

The halide salt electrolyte must be pure. The salt should be particularly free from oxygen and easily deposited metals. In practice it is purified by melting in a stream of dry halogen gas. The uranium salt is then added as $UF_4$ or $UCl_3$, or is added earlier and purified together with the solvent. Both procedures are satisfactory, although the latter procedure apparently leads to better current efficiencies.

The concentration of uranium salt that must be contained in the bath varies with such factors as temperature, composition, and stirring. Generally, about 5–15 weight percent is satisfactory; it is preferred to use low concentrations in this range to maintain a low melting point and reduce the uranium requirement. For example, with a bath of KCl-LiCl—6 weight percent $UF_4$, electrolysis has been successfully carried out at a current density of 3 amps./sq. cm. (based on initial cathode area). At theoretical current efficiency, about 3 grams uranium per amp. hr. is deposited. Actual current efficiencies are about 50–60 percent on small-scale runs, and are expected to be higher in large-scale runs. Table I below gives the current efficiencies obtained in several representative small-scale runs.

TABLE I

| Run | Total wt. of Deposit, g. | Wt. of U, g. | Amp. Hrs. | Efficiency, percent |
| --- | --- | --- | --- | --- |
| 1 | 41.0 | 9.0 | 5.0 | 60 |
| 2 | 47.5 | 11.1 | 6.7 | 56 |
| 3 | 29.9 | 7.6 | 5.0 | 51 |

Improved uranium deposition on the cathode can be obtained by stirring the bath, such as by bubbling therethrough an inert gas, e.g., helium, resulting in a good deposit of uranium having large crystals. If the bath is not agitated, smaller nonadhering crystals form, and the deposit takes on an appearance indicative of alkali metal deposition.

The electrolysis should be conducted in an inert gas atmosphere, the salt bath being maintained oxygen- and water-free. The inert gas atmosphere in which the electrolysis is conducted may be provided by a noble gas, such as helium or argon. The electrolysis is conducted at a temperature above the melting point of the electrolyte composition at which the composition is fluid. For example, with the KCl-LiCl eutectic with $UF_4$, a temperature of about 400° C. is adequate. Temperatures may generally range from about 400 to 600° C. However, if direct electrolysis into a mercury cathode is utilized, the salt near the cathode must be maintained below the boiling point of mercury, i.e., below 360° C. at atmospheric pressure.

The uranium carbide is positioned at the anode in the cell. The carbide may conveniently be in various forms, for example as small wafers cut from a rod of fused and cast UC. Contact between the UC and the current source may be made in a number of ways. For example, a molybdenum wire may be used to support a single wafer of UC, and shaped to grip the wafer by spring tension. A particularly convenient method is to place pieces of UC into a graphite crucible or on a graphite plate which is connected with the power source. Electrical contact with the UC can be improved by serrating the face of the graphite in contact with the UC.

Uranium carbide is found to dissolve readily, whereas graphite is anodically inert. The anode reaction is:

$$UC = U^{+3} + C + 3e^-$$

The resulting carbon is dispersed uniformly throughout the bath in a very finely divided state. Its presence creates no problems in the electrolysis; however, if its concentration builds up after repeated recycling, it may be filtered out of a side stream. The carbon is of benefit in absorbing fission products and thereby increasing the over-all decontamination.

The cathode, in addition to being strong and a good electrical conductor, should be inert toward the salt bath, provide a surface to which the uranium will adhere, and be inert toward the hot mercury into which it will be immersed to dissolve the dendritic uranium deposit. A number of inert metals meet these requirements, e.g., tungsten, tantalum, nickel, and uranium itself. Molybdenum is found to be particularly satisfactory. The free energy of formation of the most stable chloride of molybdenum is a small number and, therefore, molybdenum is stable toward the halide bath. The uranium deposit adheres well, and hot mercury does not attack the molybdenum.

The shape of the cathode may vary; for example, a rod form has been used. Other shapes are satisfactory for removal of large deposits, for example, three rods with ends at the corner of a triangle, or forming a section of a tube. Adherence of the uranium to the cathode is improved by cleaning the cathode, by conventional means, before positioning it in the cell.

Particularly for larger scale operation, the uranium may be directly electrolyzed into a mercury cathode, thereby eliminating one step in the cycling process. Mercury cathodes are known to the art for other uses. In the present process, such a cathode may be established in a separate half cell, or in the same cell as the anode, for instance as a pool positioned below the electrolyte, the mercury being heavier than the salt.

Completeness of deposition of the uranium on the cathode may be determined by noting the quantity of electricity consumed (ampere-hours) or by visual inspection (the electrolysis reduces green $UF_4$ to red $UF_3$). Then the cathode deposit is ready for dissolution in the mercury to separate occluded salt and to obtain further purification and decontamination from fission products.

The dendritic cathode deposit is first lifted out of the heated electrolytic cell into a cooled section containing inert gas. After cooling, the deposit is transferred to the mercury container. Since fused salt covers the uranium deposit, protecting it from the atmosphere, the deposit can be transferred in air to the mercury container. However, since the salt is hydroscopic, transfers in air are made quickly to avoid contamination by water. Hot cell operation in an inert atmosphere avoids such problems.

The uranium deposit and the occluded salt are immersed in mercury heated above the melting point of the salt and below the boiling point of mercury. Upon heating of the mercury, the salt melts rapidly and establishes a second, lighter phase on top of the mercury; the uranium rapidly forms a quasi-amalgam, probably by formation of a uranium mercuride ($UHg_4$) in Hg. A layer of the eletcrolyte salt (without the uranium) may be initially provided over the mercury to promote separation of the uranium from occluded salts. Such extraction is particularly helpful when the occluded salt melts above the boiling point of mercury. Separation of the resulting amalgam phase from the salt phase can be readily accomplished. For example, the amalgam may be separated by bottom decantation, or by filtration in a filter paper cone with a small hole at the apex; amalgam will drain through, and the salt will remain behind.

Uranium values may be recovered from the quasi-amalgam and still further purification accomplished by a number of methods, depending upon whether uranium metal or uranium carbide is desired as the final product. For example, the mercury can be separated by distillation.

Separation of the mercury and re-formation of stoichiometric uranium carbide may be accomplished by distillation of the mercury in an atmosphere of hydrocarbon gas. Any relatively light hydrocarbon gas may be used, for example methane, ethane, propane, and pentane. Dry oxygen-free natural gas is satisfactory. The conversion of uranium in the colloidally dispersed uranium mercuride to uranium monocarbide is apparently according to the following (unbalanced) reaction:

$$UHg_4 + C_mH_n = UC + Hg + H_2$$

When the mercury is hot there is an appreciable amount of uranium in true solution. The formation of UC may be by reaction of dissolved uranium with subsequent decomposition of some $UHg_4$ to maintain equilibrium. The distillation temperature is at least about 400° C. (at atmospheric pressure), while I find that heating in a natural gas atmosphere at about 500–600° C. is very satisfactory. The resulting UC is stoichiometric, and excellent decontamination and purification are obtained.

It should be noted that mercury dissolution of uranium followed by hydrocarbon gas treatment, may be employed, apart from a decontamination process, for the formation of stoichiometric UC from uranium metal. The formation of stoichiometric UC has been one of the problems in development of uranium carbide fuel elements. Stoichiometry affects the integrity of the fuel element; for example, in hyperstoichiometric compositions, carburization occurs with consequent weakening of stainless steel cladding metal as a result of its reaction with the excess carbon.

It will, of course, be understood to those skilled in this art that varying reaction conditions will be used depending upon the particular hydrocarbon gas selected to react with the quasi-amalgam. Thus, to obtain similar carbon contents, reaction of the quasi-amalgam with methane requires a longer heating time and a higher temperature compared to reaction with propane. Also, where stoichiometric uranium monocarbide is desired as the final reaction product, reaction conditions such as gas flow rate, time, temperature, and oxide contamination must be interrelated so that carbide formation does not proceed beyond UC formation to $UC_2$.

The following examples are offered to illustrate the invention in greater detail.

EXAMPLE I

Recycle of uranium carbide

An electrolytic cell was positioned in a Pyrex tube containing an argon atmosphere and sealed with a rubber stopper. The tube had gas inlet and exit tubes attached, and electrical leads passing through. The cathode comprised a ¼-inch molybdenum rod replaceable by another after build up of the uranium and salt deposit during electrolysis. The anode comprised a graphite rod with a flat graphite plate attached normally at its end for the purpose of holding uranium carbide wafers. To insure good electrical contact between the UC discs and the graphite, slits were machined in the graphite holder of such size as to hold the wafer edge tight when forced into the slot. The lower portion of the Pyrex tube containing the cell assembly was positioned in a packed furnace.

Three hundred grams of KCl–LiCl, purified by passage of chlorine therethrough, and 20 grams $UF_4$, were added as the electrolyte to the cell. Then 105 grams of UC, in the form of four wafers, each about 2 cm. x 0.6 cm., was placed on the graphite holder. The bath was maintained at a temperature of about 500° C. during electrolysis. While stirring the electrolyte by passing argon therethrough, the current was initially set at 2.0 amps and allowed to continue ¾ hour, equivalent to 1½ amp-hours. The deposit consisted of many whiskers, some extending about ⅜ inch into the melt from the main deposit. The current was then adjusted to 5 amps, and after 20 minutes the cathode was removed and examined, revealing the deposition of larger crystals. The projections were removed by rotating the deposit against the sides of a crucible, the cathode was re-inserted in the cell, and the electrolysis was continued. The maximum current employed was 10 amps, and a total of 10 amp-hours was used until the cathode was changed.

The cathode was removed from the electrolytic cell and rapidly transferred in air to a long Pyrex tube containing a mercury bath, the portion of the cathode containing the deposit being inserted in the bath. This assembly was heated to a temperature of about 360° C., with the result that the occluded salt rapidly separated into a separate phase, and a quasi-amalgam of uranium mercuride formed, the mercuride being dispersed as tiny particles throughout the mercury bath. The salt was then separated from the quasi-amalgam by careful decantation. Uranium metal was recovered by first filtering the quasi-amalgam which separated the $UHg_4$ from the mercury. The $UHg_4$ was subjected to distillation with dry propane gas at a temperature which reached 550° C. The mercury was driven off, leaving the uranium carbide product. X-ray diffraction revealed no phases other than UC.

EXAMPLE II

Purity of recycled uranium carbide

The apparatus described in Example I was employed. About 10 grams of tracer-irradiated UC and 90 grams of unirradiated UC were electrolyzed in the molten bath containing 250 grams of KCl–LiCl–10 weight percent $UF_4$. A total of six cathode deposits was saved from runs conducted at currents of ca. 4 amps for ca. 1 hour or ca. 4 amp hours total. The dendritic deposit from each run with its occluded salt was placed in a Pyrex test tube. A rubber stopper on the molybdenum rod sealed the contents of the test tube from the atmosphere. The mercury was heated by a tube furnace, and the salt was observed to melt at a temperature just below the boiling point of mercury. The dendritic deposit quickly dissolved in the boiling mercury.

The separation of the metallic phase from the salt phase was carried out by placing the mixture in a filter paper cone with a small hole at the apex, with amalgam draining through and the salt remaining behind. The mercury and uranium were then separated by distillation in a dry natural gas atmosphere at 600° C., with uranium carbide being formed and left behind. Later X-ray analysis indicated the uranium carbide to be stoichiometric uranium monocarbide. Radiochemical analysis revealed thorough decontamination of the uranium carbide from fission products, as shown in the following Table II which lists observed decontamination factors.

TABLE II

| Run | Ba | Sr | Rare Earths | Ce | Ru [1] | Zr [1] |
|---|---|---|---|---|---|---|
| 1 | 2.1×10³ | 7.0×10³ | 1.1×10³ | 85 | | 2 |
| 2 | 2.0×10³ | 6.7×10³ | 5.9×10² | 65 | | 2 |
| 3 | 3.3×10³ | 5.4×10³ | 4.1×10² | 53 | 6.0×10² | 2 |
| 4 | 5.8×10³ | | 5.6×10² | 58 | | 6 |
| 5 | 2.0×10³ | 3.0×10³ | 8.5×10² | 86 | 8.0×10² | 4 |
| 6 | 4.2×10³ | 5.2×10³ | 4.3×10² | 51 | 1.1×10³ | 6 |

[1] Over-all decontamination factors at one throughput are given for Ru and Zr.

The factors shown in the table above, except for Ru and Zr, indicate decontamination observed in going from the salt bath phase to uranium carbide powder, the final product. Over-all decontamination factors at one throughput can be greater but never less than these values.

EXAMPLE III

*Formation of uranium carbide from uranium metal*

Uranium monocarbide (UC) was also directly prepared from uranium metal. A 10-gram piece of uranium was hydrided in a round-bottomed Pyrex flask, then dehydrided by heating to ca. 550° C. in a stream of argon, in order to pulverize the solid piece of uranium metal and make it more reactive with mercury. Then 190 grams of mercury was added, and a quasi-amalgam was formed by heating to ca. 350° C. in an argon atmosphere. Dried propane gas was then admitted, the temperature gradually raised, and the mercury boiled off.

There was evidence of significant reaction between the propane and quasi-amalgam below the boiling point of mercury. In this experiment, however, the extent of UC formation before removal of mercury was not determined.

After the mercury had boiled off, the temperature increased rapidly and was maintained at ca. 550° C. for two hours. After cooling, the flask was transferred to a dry box, and samples were transferred to capillary tubes for X-ray diffraction analysis.

X-ray diffraction revealed pure uranium monocarbide (UC), i.e., no trace of other phases such as U, $UC_2$, $UO_2$, etc., was observed. X-ray fluorescence revealed no residual mercury.

EXAMPLE IV

*Formation of uranium nitride from uranium metal*

In preparing uranium nitride, a sample of uranium was first cleaned and then placed in a reaction chamber that was then evacuated and flushed with helium. The uranium was hydrided by heating in hydrogen at 250° C., then dehydrided by heating in vacuum to 400° C. The resulting powder was cooled in purified helium. Mercury was added, and a quasi-amalgam was formed by heating for about 1 hour at 300–350° C. A mercury-to-uranium ratio of approximately 25.0:1 was used in forming the quasi-amalgam.

Ammonia gas was bubbled through the amalgam as the furnace temperature was gradually raised over the range of 350–600° C. Evidence of formation of the nitride was observed as a powder on top of the amalgam. Distillation of the mercury began at about 350° C. and was generally completed before the temperature reached 500° C. Total reaction time was approximately 6 hours. After completion of the reaction, the sample chamber was cooled and the product was removed under an inert atmosphere. The resulting product was a gray pyrophoric powder which, by X-ray diffraction analysis showed a composition of $UN_2$. Although some mercury (approximately 4.5 weight percent) was retained in the product at 600° C., this mercury was readily removed by heating in vacuum.

EXAMPLE V

*Oxide formation from Th-U alloy*

A mixture of thorium and uranium oxides was prepared by first dissolving a thorium 10 w./w. uranium alloy in mercury by contacting a rod of the alloy with mercury boiling under pressure. The quasi-amalgam that formed was allowed to cool rapidly to room temperature. The cooled reaction product was centrifuged at $2000 \times g$, and various samples were taken from the top and bottom of the mixture. The mercury in the samples was distilled off in the presence of air, thorium and uranium oxides being recovered. Analysis by X-ray fluorescence did not show any significant differences in the thorium-to-uranium ratio between samples taken from the top and the bottom of the centrifuged mixture.

Although this invention has been described principally with respect to its preferred embodiment, namely the preparation of uranium carbide by reaction of the uranium quasi-amalgam with a hydrocarbon gas, particularly as part of a recycle purification process, the process is also suitable for the preparation of other binary compounds of refractory metals. Particularly of interest in nuclear fuel technology are the carbides, nitrides, and oxides of the metals of the actinide series, particularly uranium and thorium.

In its broadest aspects, the process of this invention is of interest for the prepartion of the carbides, nitrides, oxides, borides, hydrides, silicides, sulfides, selenides, and tellurides of the metals of group III–B (scandium group, including the lanthanides), IV–B (titanium group), V–B (vanadium group), and VI–B (chromium group). While the quasi-amalgam of these refractory metals will preferably be formed by reaction with mercury of the metal or a compound thereof, for certain applications it may be desirable to form instead the higher-boiling cadmium or zinc reaction products with these refractory metals.

For the gas phase reaction, it is essential that the gas used be substantially non-reactive with the group II–B metal, particularly where the group II–B metal is to be removed by subsequent distillation. It will be realized that in general, mercury will be less reactive than cadmium, which is in turn less reactive than zinc. Illustratively, the oxides are conveniently formed by reaction of the refractory metal-group II–B complex, preferably mercury, with oxygen, either pure or in diluted form as in air. The sulfides, selenides, and tellurides are conveniently formed by reaction of the group II–B complex with the corresponding hydrogen sulfide, hydrogen selenide, or hydrogen telluride. The nitrides are formed preferably by the action of ammonia, although for certain applications nitrogen or other nitrogenous gases may be used; the borons by the use of boron hydrides; the silicides by the use of silane or disilane; the carbides by any of the hydrocarbon gases, preferably the saturated hydrocarbon gases such as methane and propane.

In accordance with the patent statutes, the best mode contemplated for carrying out this invention has been set forth. However, it will be understood that the examples shown are illustrative rather than restrictive of the invention, the scope of which should be determined in accordance with the objects and claims hereof.

I claim:

1. A method for converting uranium or thorium metal into a binary compound selected from the class consisting of carbides, nitrides, and oxides, which comprises dissolving said metal in mercury to form said metal quasi-amalgam reaction product, and then distilling the resulting quasi-amalgam with a preselected gas from the class consisting of hydrocarbon gases, ammonia, and oxygen, whereby the metal is separated from the mercury and there is obtained the corresponding binary compound selected from the class consisting of carbides, nitrides, and oxides.

2. The method according to claim 1 wherein the metal is uranium, the hydrocarbon gas is a gas selected from methane and propane, and uranium carbide is obtained.

3. The method according to claim 1 wherein the metal is uranium, the gas is ammonia, and uranium nitride is obtained.

4. The method according to claim 1 wherein the metal is uranium, the gas is oxygen in the form of air, and uranium oxide is obtained.

5. A method for converting uranium metal into stoichiometric uranium monocarbide which comprises dissolving said metal in mercury to form a uranium quasi-amalgam reaction product, and then distilling the resulting quasi-amalgam with a hydrocarbon gas, thereby separating said uranium from said mercury and obtaining stoichiometric uranium monocarbide.

6. The method of claim 5 wherein said hydrocarbon gas is propane.

7. A method for the conversion of uranium metal into stoichiometric uranium carbide, which comprises providing finely divided uranium, dissolving said uranium in mercury in an inert gas atmosphere to form a uranium quasi-amalgam reaction product, and then distilling the resulting quasi-amalgam in a hydrocarbon gas atmosphere at a temperature of about 400–600° C., thereby recovering the uranium from the quasi-amalgam in the form of stoichiometric uranium monocarbide.

8. The method of claim 7 wherein said hydrocarbon gas is propane.

9. The method of claim 7 wherein the finely divided uranium is obtained as a cathodic deposit from an electrolytic process.

References Cited by the Examiner

UNITED STATES PATENTS 3,154,378  10/1964  Schneider et al. _____ 23—14.5

OTHER REFERENCES

Segre, G. J. Dissolution Rate of Uranium in Liquid Metals, June 1959, Nuclear Science Abstracts, vol. 13: 16758.

BENJAMIN R. PADGETT, *Acting Primary Examiner.*

S. TRAUB, *Assistant Examiner.*